US006771064B2

(12) United States Patent
Leibowitz et al.

(10) Patent No.: US 6,771,064 B2
(45) Date of Patent: Aug. 3, 2004

(54) INDUCTIVE SENSOR APPARATUS AND METHOD FOR DEPLOYING

(75) Inventors: Lawrence P. Leibowitz, Knoxville, TN (US); Steven R. Hilliard, Knoxville, TN (US)

(73) Assignee: Inductive Signature Technologies, Inc., Knoxville, TN (US)

( * ) Notice: Subject to any disclaimer, the term of this patent is extended or adjusted under 35 U.S.C. 154(b) by 0 days.

(21) Appl. No.: 10/184,769

(22) Filed: Jun. 28, 2002

(65) Prior Publication Data

US 2003/0016005 A1 Jan. 23, 2003

Related U.S. Application Data

(60) Provisional application No. 60/301,800, filed on Jun. 29, 2001.

(51) Int. Cl.[7] .................................................. G01B 7/14

(52) U.S. Cl. ............................ 324/207.15; 324/207.16; 340/870.31; 340/941

(58) Field of Search ....................... 326/207.15, 207.16, 326/207.17, 228, 234, 239, 242, 244, 247, 258, 260; 340/941, 933, 936, 906, 870.31

(56) References Cited

U.S. PATENT DOCUMENTS

| | | | | |
|---|---|---|---|---|
| 3,159,826 A | | 12/1964 | Morrison | |
| 3,617,890 A | | 11/1971 | Kurauchi et al. | |
| 3,641,569 A | * | 2/1972 | Bushnell et al. | 340/941 |
| 3,775,742 A | | 11/1973 | Koerner | |
| 3,984,764 A | | 10/1976 | Koerner | |
| 3,991,485 A | | 11/1976 | Golenski | |
| 4,239,415 A | | 12/1980 | Blikken | |
| 4,276,539 A | | 6/1981 | Eshraghian et al. | |
| 4,939,512 A | | 7/1990 | Dennison et al. | |
| 4,941,770 A | | 7/1990 | Gemmer | |
| 4,943,805 A | | 7/1990 | Dennison | |
| 4,945,356 A | | 7/1990 | Henderson et al. | |
| 5,245,334 A | | 9/1993 | Gebert et al. | |
| 5,491,475 A | | 2/1996 | Rouse et al. | |
| 5,554,907 A | | 9/1996 | Dixon | |
| 5,614,894 A | | 3/1997 | Stanczyk | |
| 6,342,845 B1 | | 1/2002 | Hilliard et al. | |
| 6,483,443 B1 | | 11/2002 | Lees et al. | |

* cited by examiner

*Primary Examiner*—Jay M. Patidar
(74) *Attorney, Agent, or Firm*—Pitts & Brittian, P.C.

(57) ABSTRACT

An apparatus for sensing variations in an inductive field, or inductive sensor. The inductive sensor is adapted for detecting the lateral offset of a vehicle within a roadway, especially those with multiple traffic lanes, without regard to lane boundaries, which may vary. Lateral offset information is necessary for determining lane usage statistics and is useful in detecting unsafe driving behaviors evidenced by erratic variations in lane position. Such unsafe driving behaviors are indicative of, for example, intoxicated or drowsy drivers, obstacles in the roadway requiring drastic avoidance measures, aggressive driving and other generally unsafe roadway conditions. In addition, lane position information can be passed back to the vehicle to allow for automated lane-keeping or passed to other detectors for self-calibration of the system.

27 Claims, 9 Drawing Sheets

INDUCTIVE SENSOR APPARATUS AND METHOD FOR DEPLOYING

CROSS-REFERENCE TO RELATED APPLICATIONS

This application claims the benefit of U.S. Provisional Application No. 60/301,800, filed Jun. 29, 2001.

STATEMENT REGARDING FEDERALLY SPONSORED RESEARCH OR DEVELOPMENT

Not Applicable.

BACKGROUND OF THE INVENTION

1. Field of Invention

The present invention relates to an apparatus for sensing variations in an inductive field and a method for deploying the inductance sensing apparatus. More specifically, the present invention relates to geometries and configurations for inductive sensors that are capable of producing more information than conventional inductive sensors. Additionally, the present invention relates to methods and configurations for deploying inductive sensors in locations where conventional inductive sensors are too expensive, invasive, impracticable, or inconvenient.

2. Description of the Related Art

The use of inductive wire-loop sensors with oscillator-based vehicle detectors is known to those skilled in the art. The conventional configuration, which is in common use throughout the United States, is a loop that is oriented substantially parallel to the roadway surface. The loop is a wire that is laid in a series of channels roughly defining a rectangle. Typically, there are eight cuts that make up the rectangular configuration. These include the four sides and four angular cuts, each angular cut joining two adjacent orthogonal sides. A flexible wire is placed in the cuts and the cuts are sealed. It is also known to place a wire-loop in a circular cut.

The dimensions of conventional wire-loop sensors are selected to maximize the coverage area and detect the widest variety of vehicle types while minimizing interference from electromagnetic noise and crosstalk. Generally, the signal strength of the variations in the inductive field is strongest when a vehicle passes over the entire roadway loop. Increasing the area of the roadway loop so that a vehicle passes only over part of the loop decreases the signal strength and increases the susceptibility to electromagnetic noise. For roadway loops having widely spaced parallel legs, the resulting poor signal-to-noise ratio makes it difficult to reliably detect the presence of differing classes of vehicles using the same roadway loop. Accordingly, conventional roadway loops are dimensioned so as to detect a typical vehicle with all four legs of the loop simultaneously. This results in roadway loops that are necessarily narrower than the width of a single standard twelve-foot traffic lane.

Additionally, conventional free-running oscillators used to drive the conventional roadway loops require those roadway loops in adjacent lanes to be separated by a fair distance to minimize crosstalk. For a multi-lane roadway having standard twelve-foot traffic lanes, the conventional roadway loops typically have a width of approximately six feet and are centered within the lane to provide maximum separation from roadway loops in adjacent lanes. As taught by current usage, the four legs of the roadway loop generally follow the shape of a typical vehicle as oriented in the flow of traffic along the roadway where the roadway loop is disposed.

Although a conventional roadway loop used in a multi-lane roadway may have a lead line extending outside of the traffic lane to connect the roadway loop to a controller, the inductive field generating legs of the conventional roadway loop are not known to extend across the entire width of a roadway.

As previously discussed, the installation of each inductive sensor in an existing roadway requires cutting the roadway surface to receive the inductive sensor, together with the additional cuts necessary to connect the inductive sensor to the controller. The conventional method of installing a vehicle detection system includes placing a series of inductive sensors in the roadway and connecting them to distantly located controllers through trenches dug beside the roadway. A major portion of the cost of installing a vehicle detection system that links disparate sections of highway, as in the case of a traffic flow monitoring system along a freeway, is associated with the trenching operation in the form of insurance against cutting underground communication or power lines due to monetary penalties for interruption of service. Accordingly, the cost is artificially inflated and does not bear a reasonable relation to the actual effort and expense incurred for the acquisition and installation of the vehicle detection system.

BRIEF SUMMARY OF THE INVENTION

An inductive sensor capable of providing information as to the lateral offset of a vehicle within a traffic lane is disclosed. The inductive sensor is generally configured such that the angular offset between the generally horizontal plane, which represents the roadway surface, and the plane defined by the longitudinal legs of the inductive sensor varies with the length. In one embodiment, the inductive sensor includes two wire-loops with each wire-loop having an orientation that varies along the length of the sensor. The wire-loops are displaced from each other by an angular offset.

In an alternate embodiment, the inductive sensor includes a pair of generally coplanar wire-loops. The outside legs of the co-planar wire-loops generally form a quadrilateral. The quadrilateral defines a longitudinal axis that is bisected at the midpoint by a pair of abutting inside legs, one from each wire-loop. The inductive field for the two wire-loops is balanced under normal conditions. However, in the presence of a vehicle, the inductive field of the wire-loops becomes unbalanced allowing the lateral offset of the vehicle within the roadway to be determined. The inductive sensor is disposed either substantially parallel or substantially perpendicular to the roadway surface. One embodiment includes two substantially parallel, substantially concentric inductive sensors, each inductive sensor including two wire-loops. When in the substantially concentric orientation, one inductive sensor is placed closer to the roadway surface than the other inductive sensor so that the inductive field is adapted to detect wheel spikes. In the substantially perpendicular orientation, the two wire-loops of the inductive sensor are typically placed in an over-under arrangement.

The composite of the measured inductance of a vehicle obtained using the inductive sensor remains consistent for a given vehicle. However, the measured inductance from each of the wire-loops varies depending upon the lateral offset of the vehicle within the traffic lane.

The ability to detect the lateral offset of a vehicle within a roadway allows the inductive sensor of the present invention to be installed without having to be matched to the final position of the traffic lanes. It allows for self-calibration of the system that relaxes the need for costly and time-consuming installations.

Installation of an inductive sensor during the construction of a new roadway and the resurfacing or repair of an existing roadway can be accomplished by simply embedding the inductive sensor in the roadway during the paving process at a reduced cost and a reduced inconvenience. However, it is not always considered, currently desired, or budgeted to install a vehicle detection system when road repair or construction occurs. By using a vehicle detection installation system including a conduit along the length of the roadway that provides access to a series of detectors, spaced at a desired interval, the decision to install a complete vehicle detection system can be delayed without excessive additional cost.

Generally, the conduit carries power and communications and is adapted to allow inductive detectors to be connected to the network. This allows the detectors to be spaced more closely than the typical one-third to one-half mile spacing because of ready access to power and communications. An access port provides access to the interior of the conduit, to allow for installation, maintenance or repair of the vehicle detection system hardware.

In another embodiment, the inductive sensor requires little or no cutting of the roadway surface, i.e., nondestructive, so as to leave the structural integrity of the roadway intact and to reduce the cost of installation. This is useful on roadways where cutting is either undesirable or prohibited such as on bridges. It is further useful in areas where a large area of detection is desired or where lanes of travel are not clearly defined. Finally, such an inductive sensor is useful where a temporary installation is needed. The inductive sensor is formed using a conductive material painted on, or otherwise adhered to the roadway surface, or filled into shallow grooves.

BRIEF DESCRIPTION OF THE SEVERAL VIEWS OF THE DRAWINGS

The above-mentioned features of the invention will become more clearly understood from the following detailed description of the invention read together with the drawings in which.

DETAILED DESCRIPTION OF THE INVENTION

An apparatus for sensing variations in an inductive field, or inductive sensor, is illustrated at 10 in the Figures. The inductive sensor is adapted for detecting the lateral offset of a vehicle within a roadway, especially those with multiple traffic lanes, without regard to lane boundaries, which may vary. Lateral offset information is necessary for determining lane usage statistics and is useful in detecting unsafe driving behaviors evidenced by erratic variations in lane position. Such unsafe driving behaviors are indicative of, for example, intoxicated or drowsy drivers, obstacles in the roadway requiring drastic avoidance measures, aggressive driving and other generally unsafe roadway conditions. In addition, lane position information can be passed back to the vehicle to allow for automated lane-keeping or passed to other detectors for self-calibration of the system.

For discussion purposes, it is useful to define the length of the roadway as the dimension of the roadway corresponding to the direction of travel. The width of the roadway is the side-to-side dimension. Conversely, with respect to the inductive sensors used in the vehicle detection system, the length of the inductive sensor is the longitudinal dimension corresponding most closely to the width of the roadway and the width of the inductive sensor refers to the distance between the two longitudinal legs of the inductive sensor.

Figures 1, 3, 4, 5:
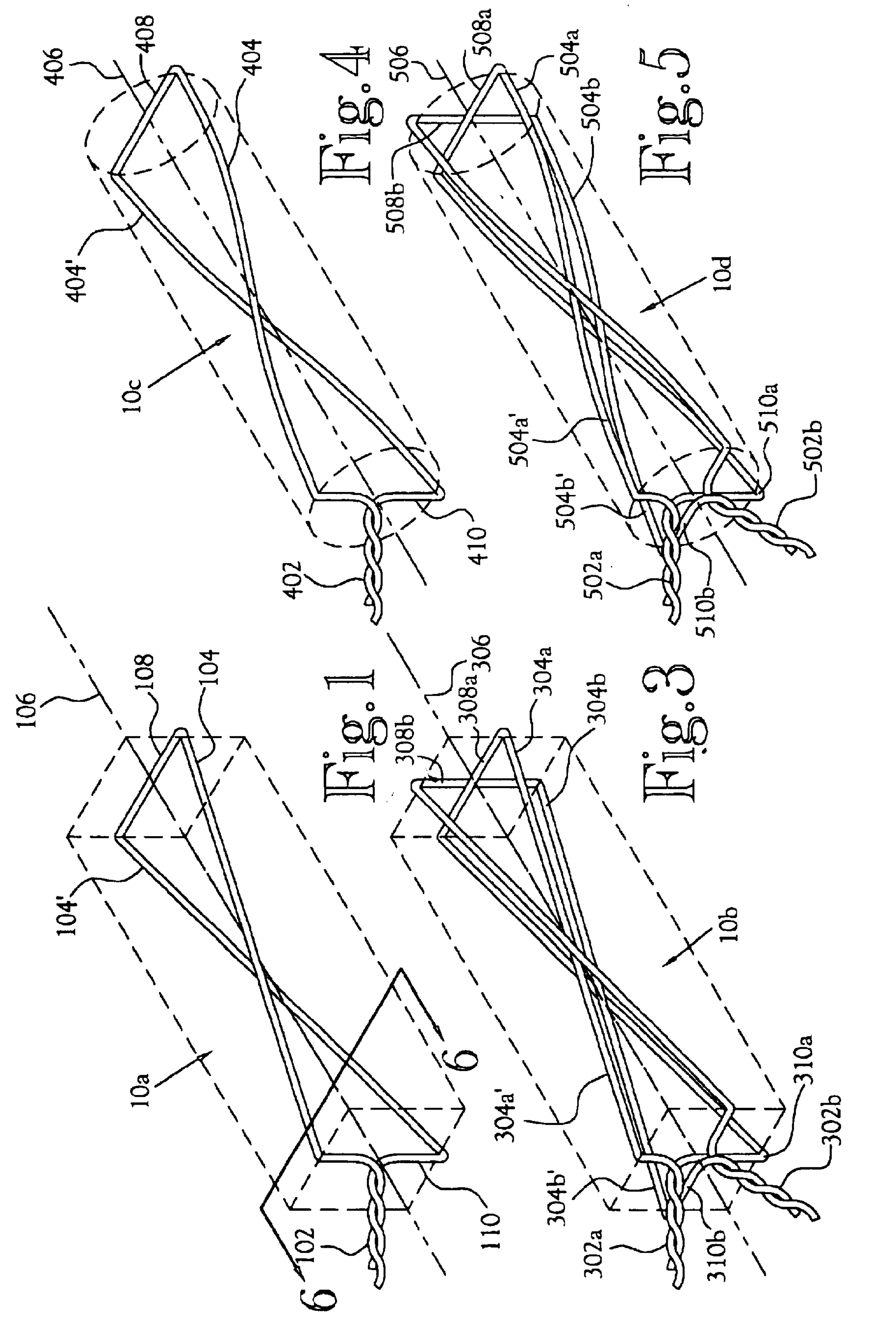
FIG. 1 is a perspective view of an inductive sensor for detecting the lateral offset of a vehicle within a traffic lane.
FIG. 3 is a perspective view of another inductive sensor for detecting the lateral offset of a vehicle within a traffic lane.
FIG. 4 is a perspective view of yet another inductive sensor for detecting the lateral offset of a vehicle within a traffic lane.
FIG. 5 is a perspective view of still another inductive sensor for detecting the lateral offset of a vehicle within a traffic lane.

FIG. 1 illustrates an inductive sensor 10*a* that is capable of providing information as to the lateral offset of a vehicle within a roadway. The inductive sensor 10*a* is generally configured such that the angular offset between the horizontal plane, which represents the roadway surface, and the plane defined by the longitudinal legs 104 of the inductive sensor 10*a* varies with the length. In the illustrated embodiment, an inductive sensor 10*a* having a single wire-loop 102 is shown. The wire-loop 102 defines a longitudinal axis 106. Each longitudinal leg 104, 104' of the wire-loop 102 is equidistant from the longitudinal axis 106.

Figure 2:
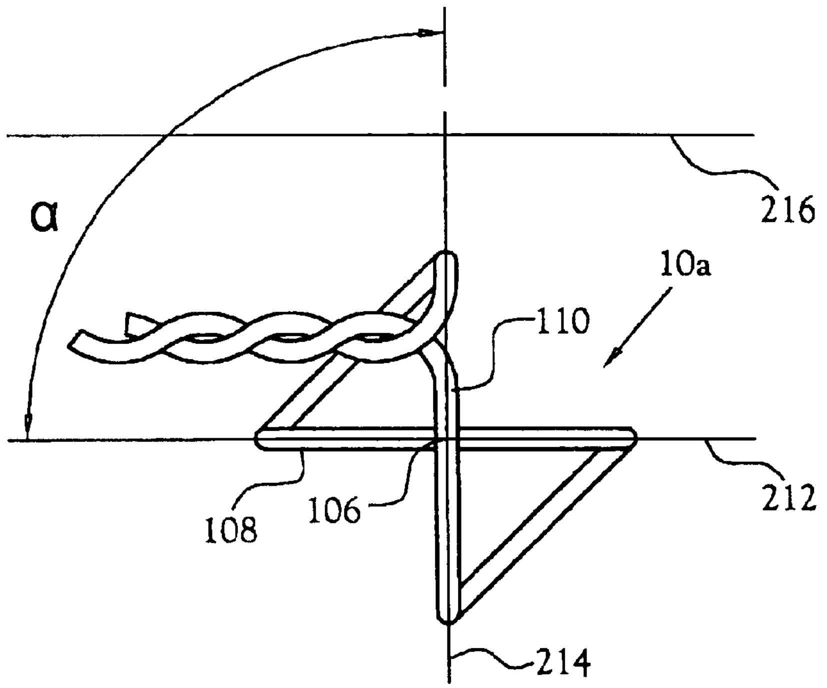
FIG. 2 is an edge view of the inductive sensor of FIG. 1.

FIG. 2 is an edge view of the inductive sensor 10*a* illustrated in FIG. 1, which clearly shows the relative orientation of the inductive sensor 10*a*. At one end 108, the plane 212 defined by the pair of longitudinal legs 104 is substantially parallel to the horizontal plane 216. At the opposite end 110, the plane 214 defined by the pair of longitudinal legs 104 is substantially perpendicular to the horizontal plane 216, such that the ends 108, 110 have an angular offset, a, of approximately ninety degrees. Those skilled in the art will recognize that the angular offset can vary without departing from the scope and spirit of the present invention.

FIG. 3 illustrates an alternate embodiment of the inductive sensor 10*b* that includes two wire-loops 302 defining a pair of longitudinal legs 304*a*, 304*b*, 304*a'*, 304*b'* and a common longitudinal axis 306. The inductive sensor 10*b* is generally configured such that the angular offset between the horizontal plane, which represents the roadway surface, and the plane defined by the longitudinal legs 304*a*, 304*b*, 304*a'*, 304*b'* of each wire-loop 302 varies with the length. Further, the wire-loops 302 are displaced from one another by an angular offset. The longitudinal legs 304*a*, 304*b*, 304*a'*, 304*b'* of each wire-loop 302 are equidistant from the longitudinal axis 306. In the illustrated embodiment, the first wire-loop 302*a* is displaced by approximately ninety degrees from the second wire-loop 302*b*. At one end 308*a*, 308*b*, the plane defined by the pair of longitudinal legs 304*a*, 304*a'* of the first wire-loop 302*a* is substantially parallel to the horizontal plane and the plane defined by the longitudinal legs 304*b*, 304*b'* of the second wire-loop 302*b* is substantially perpendicular to the horizontal plane. At the opposite end 310*a*, 310*b*, the plane defined by the pair of longitudinal legs 304*a*, 304*a'* of the first wire-loop 302*a* is substantially perpendicular to the horizontal plane, such that the ends 308*a*, 308*b*, 310*a*, 310*b* of the first wire-loop 302*a* have an angular offset of approximately ninety degrees. Similarly, the plane defined by the pair of longitudinal legs 304*b*, 304*b'* of the second wire-loop 302*b* is substantially parallel to the horizontal plane.

FIG. 4 illustrates another alternate embodiment of an inductive sensor 10*c* that is capable of providing information as to the lateral offset of a vehicle within a traffic lane. For convenience, this type of sensor is generically referred to as a helical sensor. The inductive sensor 10*c* is generally configured such that the angular offset between the horizontal plane, which represents the roadway surface, and the plane defined by the longitudinal legs 404, 404' of the inductive sensor 10*c* is helicoidal. In the illustrated embodiment, an inductive sensor 10*c* having a single wire-loop 402 is shown. The wire-loop 402 defines a longitudinal axis 406. Each longitudinal leg 404, 404' of the wire-loop 402 is equidistant from the longitudinal axis 406 and follows a helical path, such that a pair of the legs forms a double helix. At one end 408, the plane defined by the pair of longitudinal legs 404, 404' is parallel to the horizontal plane. At the opposite end 410, the plane defined by the pair of longitudinal legs 404, 404' is substantially perpendicular to the horizontal plane, such that the ends 408, 410 have an angular offset of approximately ninety degrees. Those skilled in the art will recognize that the pitch of the helical legs can vary to produce a sensor having a desired angular offset per unit length without departing from the scope and spirit of the present invention.

FIG. 5 illustrates yet another alternate embodiment of the inductive sensor 10*d* that includes two wire-loops 502 defining a pair of longitudinal legs 504, 504*a'* and a common longitudinal axis 506. The inductive sensor 10*d* is generally configured such that the angular offset between the horizontal plane, which represents the roadway surface, and the plane defined by the longitudinal legs 504*a*, 504*b*, 504*a'*, 504*b'* of each wire-loop 502 is helicoidal. Further, the wire-loops 502 are displaced from one another by an angular offset. The longitudinal legs 504*a*, 504*b*, 504*a'*, 504*b'* of each wire-loop 502 are equidistant from the longitudinal axis 506 and each longitudinal leg 504*a*, 504*b*, 504*a'*, 504*b'* follows a helical path, such that a pair of double helixes, displaced by an angular offset are formed. In the illustrated embodiment, the first wire-loop 502*a* is displaced by approximately ninety degrees from the second wire-loop 502*b*. At one end 508*a*, 508*b*, the plane defined by the pair of longitudinal legs 504*a*, 504*a'*of the first wire-loop 502*a* is substantially parallel to the horizontal plane and the plane defined by the longitudinal legs 504*b*, 504*b'* of the second wire-loop 502*b* is substantially perpendicular to the horizontal plane. At the opposite end 510*a*, 510*b*, the plane defined by the pair of longitudinal legs 504*a*, 504*a'* of the first wire-loop 502*a* is substantially perpendicular to the horizontal plane, such that the ends 508*a*, 508*b*, 510*a*, 510*b* of the first wire-loop 502*a* have an angular offset between them of approximately ninety degrees. Similarly, the plane defined by the pair of longitudinal legs 504*b*, 504*b'* of the second wire-loop 502*b* is substantially parallel to the horizontal plane.

Those skilled in the art will recognize that a number of variations to the embodiments of inductive sensor shown in FIGS. 1 through 5 can be made without departing from the scope and spirit of the present invention. First, the angular offset along the length can vary per unit length rather than over the entire length of the longitudinal legs, thereby creating a repeating pattern. For example, where the repeating pattern results in a ninety degree rotation every twelve feet, which coincides with the width of a standard traffic lane, the information obtained from the inductive sensor can be used to determine the position of the vehicle within a specific traffic lane. Second, the angular offset between the wire-loops in an inductive sensor containing multiple wire-loops can vary from the exemplary angular offset. Third, the number of wire-loops utilized in the inductive sensor can vary. Fourth, the longitudinal legs of the wire-loop need only be symmetric around, not be equidistant from, the latitudinal axis, for example, where the wire-loop is wound around a rectangular solid. Finally, the initial and terminal angular offsets with respect to the roadway surface can vary from the exemplary angular offset. The above list of variations is not intended to be exclusive, but rather to illustrate some of the variations possible.

Figure 6:
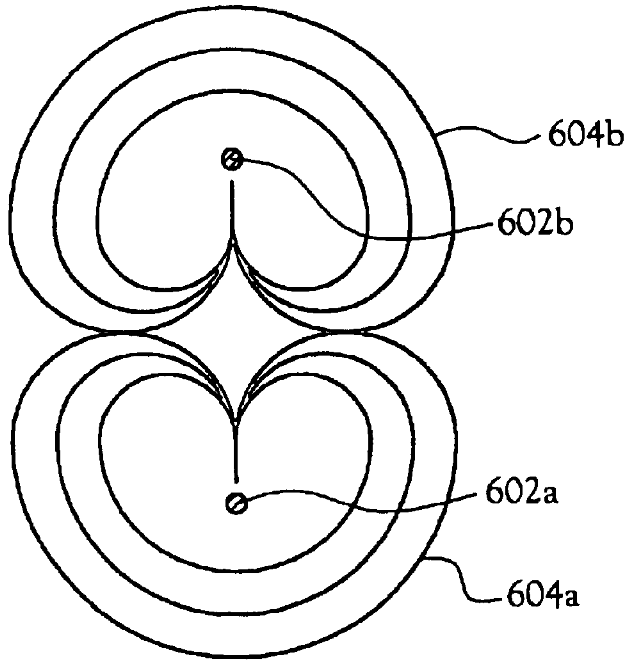
FIG. 6 is a cross-section of the inductive sensor of FIG. 1, taken at section 6—6 of FIG. 1, showing the magnetic lines of flux emanating from the closely spaced legs of the wire-loop.

The inductive sensors previously discussed are characterized by having a substantial dimension in each of the three-dimensions, when compared to conventional inductive sensors, which are generally two-dimensional. The actual dimensions of the inductive sensors of the present invention can vary widely depending upon the desired detection capabilities. An inductive sensor with a small diameter produces a small signal with a high signal-to-noise ratio. When the inductive sensor includes closely spaced legs or multiple closely spaced wire-loops, the effective sensing range of small diameter inductive sensors is limited, as illustrated in FIG. 6. FIG. 6 shows how the electromagnetic fields, which are represented by the lines of flux 604*a*, 604*b*, generated by two closely spaced legs of a wire-loop 602*a*, 602*b* with currents flowing in opposite directions, i.e., 180° out of phase, serve to offset one another. This limits the expansion of the fields and creates a region where the fields effectively cancel each other. The limited detection field produced by such a configuration is relatively close to the roadway surface such that the body of the vehicle is generally invisible to the detector. Accordingly, this inductive sensor configuration is ideally suited for detecting wheel spikes.

In a typical roadway application for the detection of ground vehicles, the diameter of the inductive sensor can vary between one and ten centimeters. However, this range is not intended to be exclusive, merely exemplary. Larger diameters can be used where extended detection ranges are desired or necessary. For example, in an airport runway, an inductive sensor having a diameter in excess of ten feet would enable detection of an ascending or descending aircraft during takeoff or landing. Because of the diameter, the inductive sensors of FIGS. 1–5 require wider cuts to be made in the roadway surface than a conventional wire-loop sensor. Accordingly, they are best suited for installation during new construction or resurfacing of a roadway, although not limited to such installation.

Installation during construction or resurfacing of a roadway presents special problems not faced when retrofitting an existing roadway with wire-loop sensors. An inductive sensor installed during construction or resurfacing is not deployed with the benefit of the knowledge of the final location of the traffic lanes. The final location of the traffic lanes depends heavily on the vagaries of the paving and line marking crews. Additionally, the actual depth and orientation of the inductive sensor in relation to the roadway surface can vary. Such variations can greatly hamper the ability to perform presence detection, identify a vehicle and, more importantly, to re-identify the vehicle at subsequent sensors. Finally, the inductive sensors of the present invention were illustrated with each wire-loop at a known angular orientation with respect to the roadway surface. However, the present inventors recognize a desire to avoid the need for precision installation in the field. Accordingly, a vehicle detection system 700 suitable for use with inconsistently installed inductive sensors is illustrated in FIG. 7.

Figure 7:
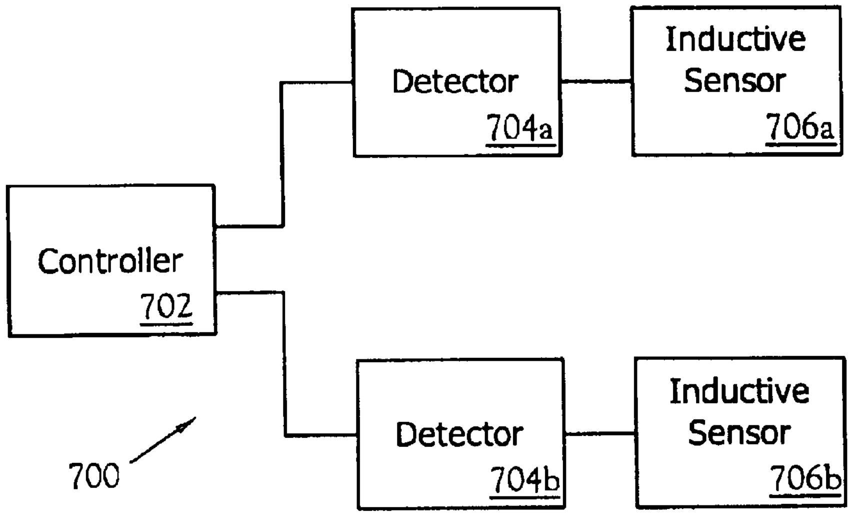
FIG. 7 is a block diagram of a network of vehicle detectors capable of operating as a self-calibrating system.

Through the vehicle detection system 700 illustrated in FIG. 7, the inductive sensors are self-calibrating. The vehicle detection system 700 includes a controller 702 in communication with a detector 704*a*, 704*b* attached to a corresponding inductive sensor 706*a*, 706*b*. The controller 702 processes the data obtained from each detector 704*a*, 704*b* and correlates the data to look for similarities in the inductive signature. Where similar inductive signatures are obtained, the differences between the inductive signatures are used to identify characteristics of the inductive sensor from which it was obtained. The ability to re-identify a vehicle as it crosses neighboring sensors greatly enhances the speed and accuracy with which the system can self-calibrate. For example, differences in the amplitudes of the inductive signatures can indicate that the inductive sensors are located at different depths below the roadway surface. Once the difference is known, the output of each inductive signature can be adjusted to accommodate for the difference in depth. Similarly, where the inductive sensors are not installed with a uniform angular orientation with respect to the roadway surface, these variations are detected and the actual angular orientation of each roadway sensor is determined and the output of the in inductive sensor is compensated. In addition, where the inductive sensor is installed prior to lane marking or where the lane marking changes due to construction, either temporarily or permanently, the relative position of each traffic lane is determined by considering the lateral offset of a plurality of vehicles using statistical analysis. This allows for continuous real-time monitoring of roadway conditions, and with a sufficient network, the automated updating of roadway map databases. To this end multiple controllers are linked into a neural network, sharing information.

Figure 8:
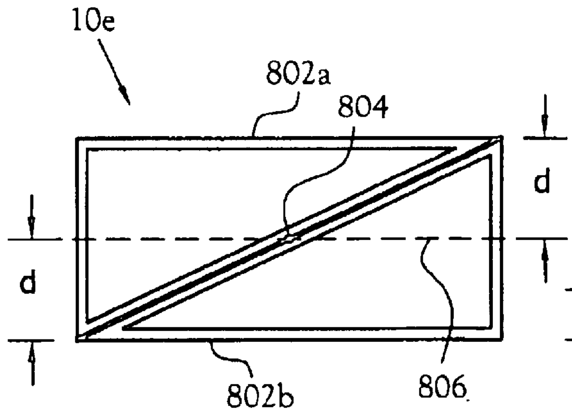
FIG. 8 is a top plan view of another inductive sensor for detecting the lateral offset of a vehicle within a traffic lane.
Figure 9:
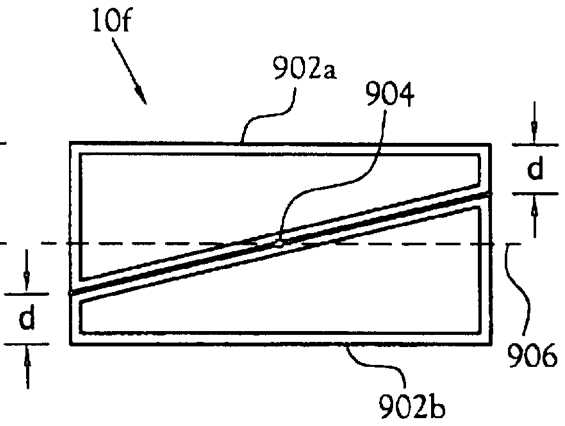
FIG. 9 is a top plan view of a variation of the inductive sensor of FIG. 8.

Variations on another embodiment of the inductive sensor 10*e* that provides information about the lateral offset of a vehicle on a roadway are illustrated in FIGS. 8 and 9. The inductive sensor 10*e*, 10*f* includes two wire-loops 802*a*, 802*b*; 902*a*, 902*b* lying in the same plane and abutting along one of the longitudinal legs of each wire-loop 802*a*, 802*b*; 902*a*, 902*b*. The perimeter of the two wire-loops 802*a*, 802*b*; 902*a*, 902*b* substantially defines a quadrilateral. Further, a longitudinal axis 806, 906 is defined at the line equidistant from the outermost longitudinal legs of each wire-loop. The abutting longitudinal legs pass through the midpoint 804, 904 of the longitudinal axis 806, such that the pair of wire-loops 802*a*, 802*b*; 902*a*, 902*b* is symmetric.

Figure 10:
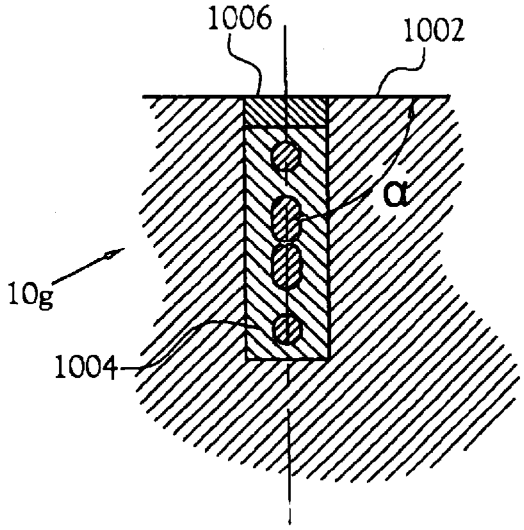
FIG. 10 illustrates the inductive sensor of FIG. 9 in an orientation substantially perpendicular to a roadway surface.

This configuration of wire-loops can be effectively deployed either substantially parallel to or substantially perpendicular to the horizontal plane representing the roadway surface. FIG. 10 illustrates one embodiment of the inductive sensor 109, which is deployed substantially perpendicular, or plumb, with respect to the roadway surface 1002. A filler material 1006 is applied to secure the inductive sensor leg in place. For ease of installation, the inductive sensor leg is generally pre-formed on a loop-forming member 1004. The loop-forming member 1004 is fabricated from a polymeric material that holds a substantially rigid form but has some flexibility to allow for movement of the pavement due to thermal expansion and contraction as well as to conform to the shape of the pavement. Typically, the loop-forming member is not electrically conductive; however, it can be thermally conductive to thermally link multiple wire-loops of the same inductive sensor to minimize variations in the inductive measurement due to temperature drift. Those skilled in the art will recognize that a loop-forming member is not required to achieve the desired inductive sensor configurations. Acceptable results can be achieved using a substantially rigid wire, which holds the desired shape for the wire-loop, or by installation procedures that are intended to properly shape the wire-loops of the inductive sensor at the site of installation. Those skilled in the art will recognize that the configuration of the inductive sensor can vary without departing from the scope and spirit of the present invention. For example, although the abutting longitudinal legs of the two wire-loops are illustrated in a side-by-side configuration, they can be twisted together.

Figure 11:
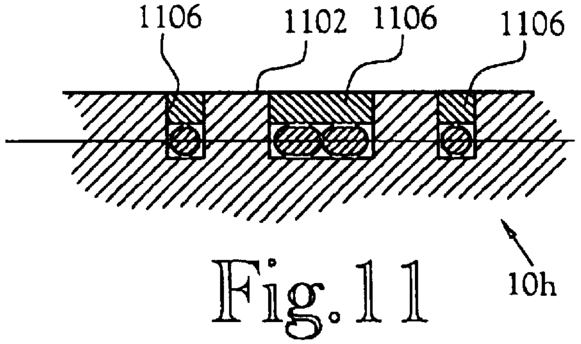
FIG. 11 illustrates the inductive sensor of FIG. 9 in an orientation substantially parallel to a roadway surface.

FIG. 11 illustrates a version 10*h* of the inductive sensor of FIGS. 8 and 9 in an orientation substantially parallel to the roadway surface 1102. Because the wires are at the same depth relative to the roadway surface 1102, the electromagnetic field will preferentially detect the body of the vehicle and substantially drown out the wheel spike.

Figure 12:
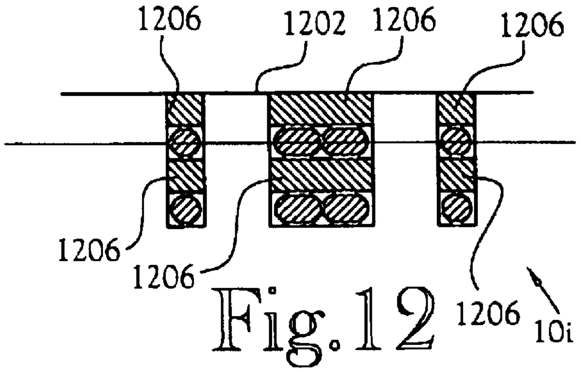
FIG. 12 illustrates two concentric parallel inductive sensors located at different depths with respect to the roadway surface.

FIG. 12 illustrates a variation of FIG. 11, having two inductive sensors 10*i* that are substantially concentric and located in substantially parallel planes, but at different depths with respect to the roadway surface 1202. The reach of the electromagnetic field is selectively limited, as shown and described in relation to FIG. 6, making the inductive sensor 10*i* particularly sensitive to wheel spikes. In the illustrated embodiment, the inductive sensor is constructed from rigid wire and has no loop-forming member. A filler material provides separation between the wire-loops and secures them in place. Those skilled in the art will recognize that concentric pairs of loops can be used with virtually any known wire-loop configuration to adapt the inductive sensor to detect wheel spikes, which are useful for identification and re-identification of a vehicle.

Figure 13:
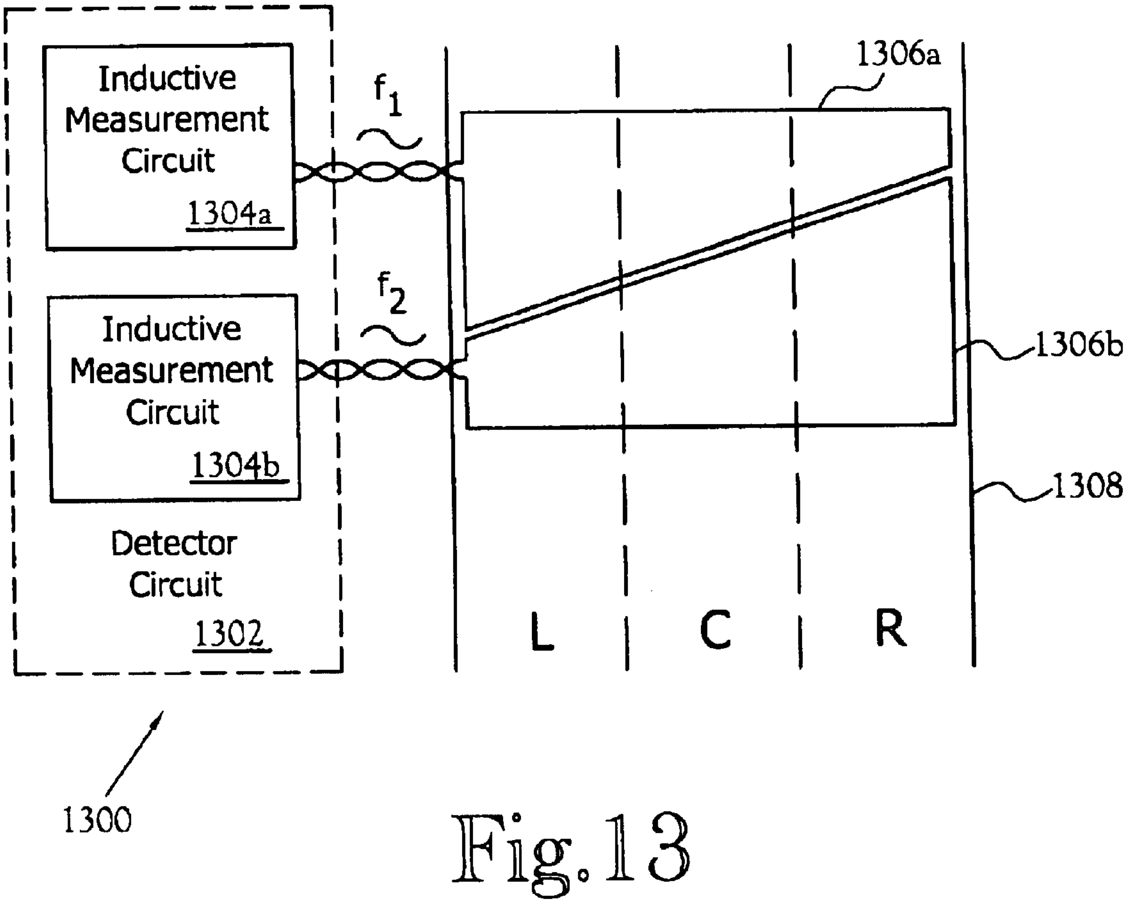
FIG. 13 illustrates a vehicle detection system for detecting the lateral offset of a vehicle within a traffic lane.

One method of determining the lateral position of a vehicle using an inductive sensor that has a plurality of wire-loops takes advantage of the beat frequency. Consider the vehicle detection system 1300 of FIG. 13. The vehicle detector system is deployed in a roadway 1308 having three lanes: left (L), center (C), and right (R). The detector circuit 1302 of the vehicle detection system 1300 includes two inductive measurement circuits 1304*a*, 1304*b*. Each inductive measurement circuit 1304*a*, 1304*b* drives one wire-loop 1306*a*, 1306*b* of the inductive sensor at a unique fixed frequency. The wire-loops 1306*a*, 1306*b* are matched and are inductively coupled due to their close proximity to one another. The driving signals have substantially equivalent amplitudes. For reference, the driving signals are illustrated in FIG. 13 as $f_1$ and $f_2$. The two wire-loops are matched and inductively coupled and a steady state condition is established when no vehicle is present. As a vehicle crosses over the inductive sensor, the amplitude of the signals on the two wire-loops vary in response the changes in the inductive field.

Figure 14:
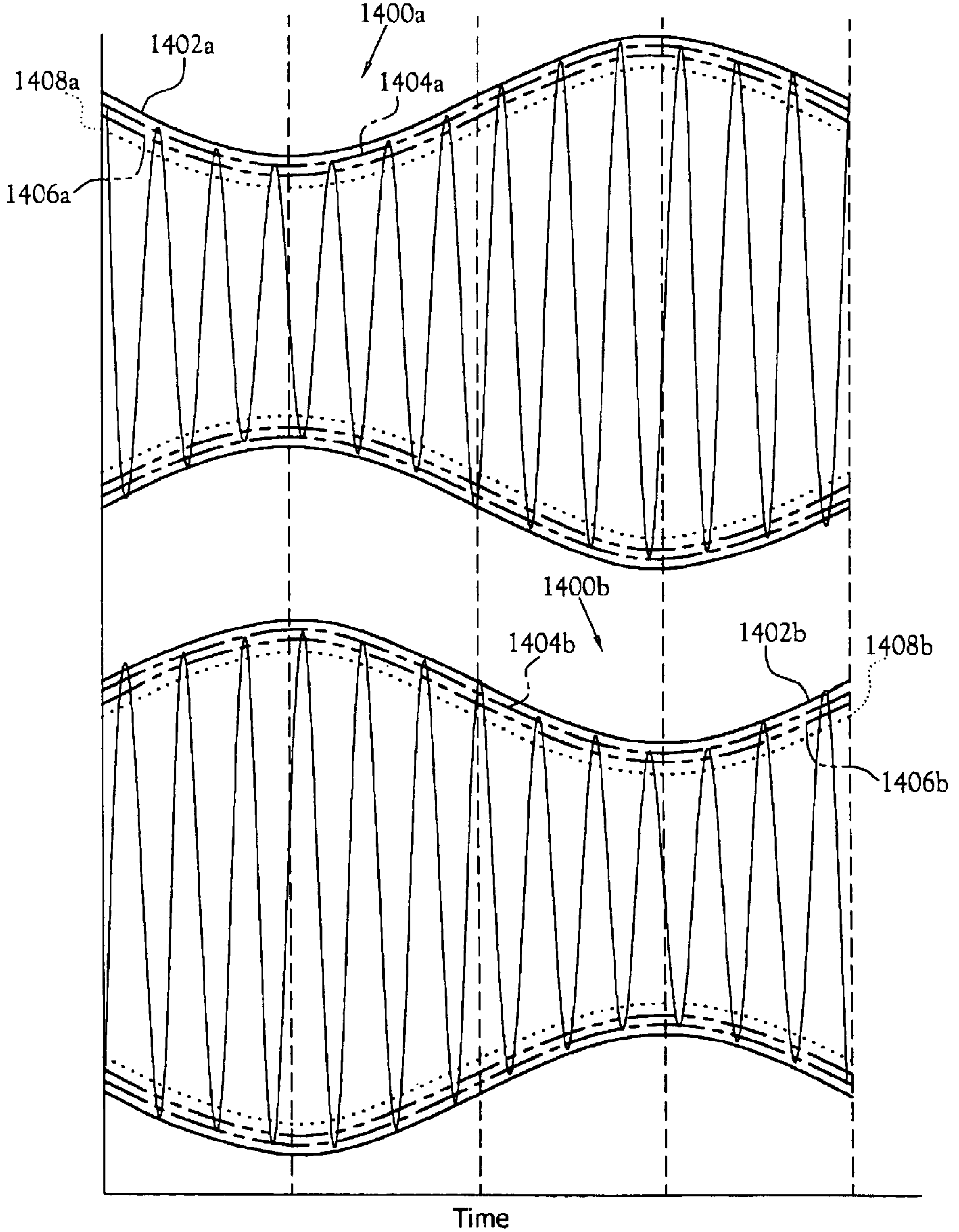
FIG. 14 is a snapshot of one beat period for the inductive sensor of FIG. 11 for a vehicle detector looking at the body of a vehicle.

FIG. 14 is a graph of a single beat produced by the vehicle detection system for FIG. 13 using the configuration shown in FIG. 11. The beat frequency is defined by the relationship: $f_b=|f_2-f_1|$. An integer number of beats may be integrated over time to derive one point on an inductive signature. The top waveform 1400*a* represents the output of the first wire-loop 1306*a*. The bottom waveform 1400*b* represents the output of the second wire-loop 1306*b*. Because of the symmetry of the wire-loop geometries, the output signals are likewise symmetric. The envelope 1402*a*, 1402*b* of each waveform 1400*a*, 1400*b* represents the case where no vehicle is present, the baseline for the wire-loop. As a vehicle approaches the vehicle detection system 1300, the amplitude of the output signals change moving the envelopes. The envelopes react in the presence of a vehicle. The amount of reaction inversely corresponds to the area of wire-loops 1306*a*, 1306*b* at the point where the vehicle crosses the wire-loops 1306*a*, 1306*b*. The direction of the reaction depends upon which side of the resonance frequency that the oscillator is operating. The envelope 1404*a* represents a response of the vehicle detection system 1300 to a vehicle crossing the first wire-loop 1306*a* in the right lane. A vehicle crossing the first wire-loop 1306*a* in the center lane produces the envelope 1406*a*, which has a slightly smaller response than the envelope 1404*a* due to the smaller area of the first wire-loop 1306*a* presented to the vehicle. Finally, a vehicle crossing the first wire-loop 1306*a* in the left lane produces the envelope 1408*a*, which has the smallest response due to the vehicle passing over the smallest area of the first wire-loop 1306*a*.

The results from the second wire-loop 1306*b* show similar but opposite envelope response characteristics due to the reversed geometry between the first wire-loop 1306*a* and the second wire-loop 1306*b*. The envelope 1404*b* represents the response of the vehicle detection system 1300 to a vehicle crossing the second wire-loop 1306*b* in the left lane. A vehicle crossing the second wire-loop 1306*b* in the center lane produces the envelope 1406*b*, which has a slightly smaller response than the envelope 1404*b* due to the larger area of the second wire-loop 1306*b* presented to the vehicle. Finally, a vehicle crossing the second wire-loop 1306*b* in the right lane produces the envelope 1408*b*, which is the largest response due to the vehicle passing over the largest area of the second wire-loop 1306*b*.

The difference between the two signals is a function of the distance between the longitudinal legs of the wire-loops at the point where the vehicle crosses the inductive sensor. The illustrated graph assumes that the fixed frequency is greater than the resonant frequency of the wire-loop, the envelope expands rather than contracts, i.e., the amplitude increases in the presence of a vehicle. The two signals are added together to produce an inductive signature having the lateral offset variance removed. Taking a moving average of the output signals over a period of the beat suppresses the beat and produces a vehicle signature containing lateral offset information.

Figure 15:
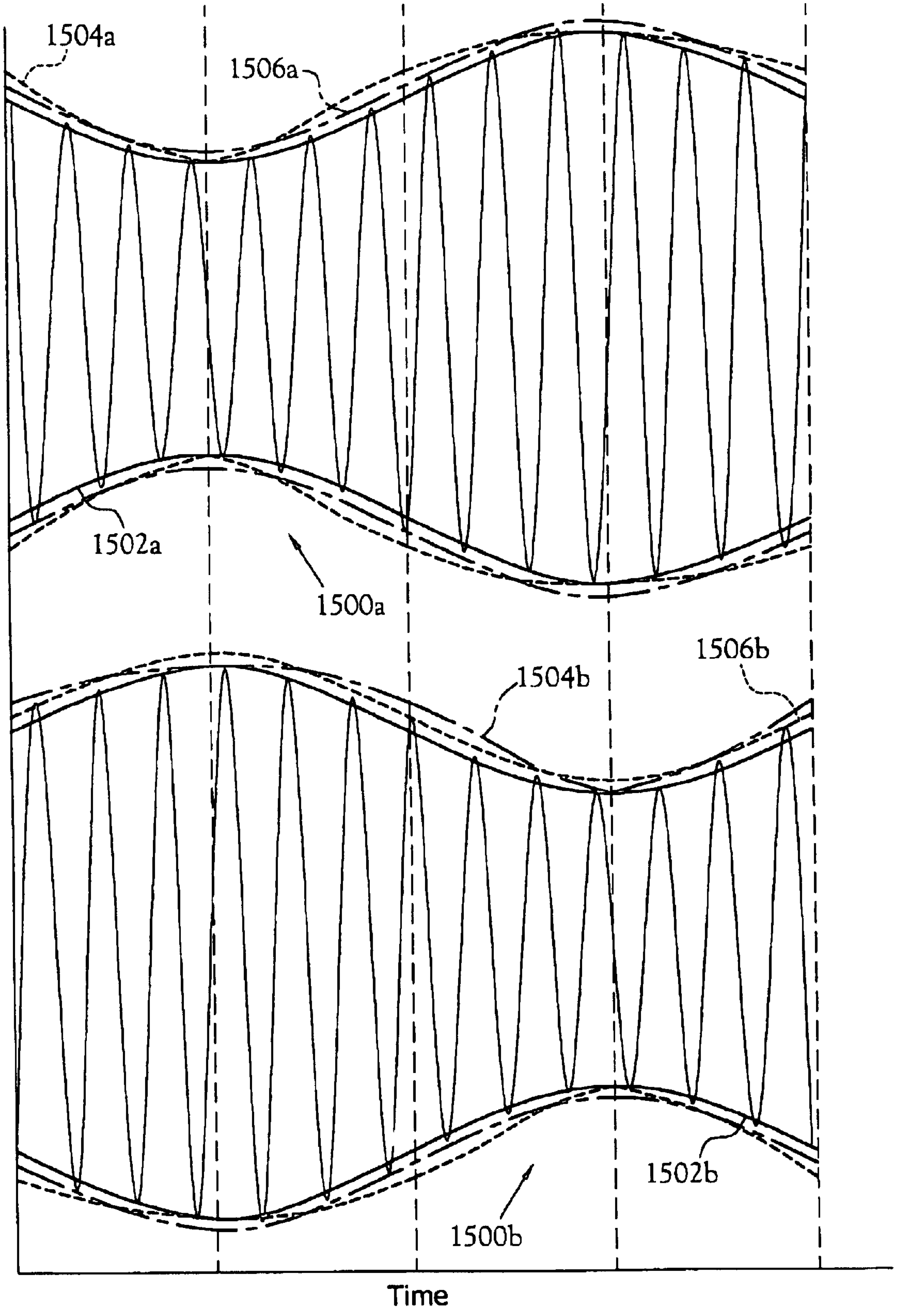
FIG. 15 is a graph of a snapshot of one beat period for the inductive sensor of FIG. 12 for a vehicle detector looking at the wheels of a vehicle.

FIG. 15 is a graph of a single beat produced by a variation of the vehicle detector of FIG. 13 that uses four inductive measurement circuits attached to concentric wire-loop pairs illustrated in FIG. 12. The beat and carrier waves are similar, but the difference in the modulation in the presence of a vehicle is what is being measured. In FIG. 15, the detected signal primarily represents a wheel spike as opposed to the body of the vehicle. The waveforms 1500*a*, 1500*b* represent the output of the upper pair of loops. The output of the lower pair of loops would have a similar shape but smaller amplitude. The difference of which can be detected by subtracting the upper and lower loops. As before, the envelopes 1502*a*, 1502*b* when no vehicle is present sets the baseline. When the inner leg of the first wire-loop 1306*a* detects a wheel, the envelope 1504*a* results and when the inner leg of the second wire-loop 1306*b* detects the presence of a vehicle, the envelope 1504*b* is produced. Similarly, the envelope 1506*a* represents where the outer leg of the first wire-loop 1306*a* detects a wheel and the envelope 1506*b* represents where the outer leg of the second wire-loop 1306*b* detects a wheel. Interestingly, the wheels deflect the envelope in the opposite direction of the body of the vehicle. Adding the two signals together gives an inductive signature without the lateral offset variation. To determine the lateral offset, information from each output signal and the composite inductive signature must be combined with knowledge of the inductive sensor configuration. The composite inductive signature is compared with one of the output signals. Where both contain a wheel spike, the incident occurred on an outer leg. If no wheel spike appears in the composite inductive signature at a time when a wheel spike occurs in either output signal or where the wheel spike amplitude of the composite inductive signature is approximately twice that of an output signal, the incident occurred on an inner leg. By obtaining a set of wheel spike incidents spanning both outer legs and the inner leg and comparing the relative time of occurrence for each wheel spike to the others, a ratio is developed that provides the lateral offset positions.

This same relationship can be achieved by driving the wire-loops at the same fixed frequency but with the signals out of phase, typically by 180°. In that case, the signals of the inner leg cancel effectively causing the inner leg to appear insensitive in the composite inductive signature.

For a vertically oriented configuration of the inductive sensor as illustrated in FIG. 9, in response to a vehicle, the lower wire-loop produces a signal with a smaller amplitude than the upper wire-loop. The proportionality between the measured inductance on the two wire-loops diverges when detecting wheel spikes due to the close proximity. In addition, speed is measured using a single pair of vertically oriented wire loops by detecting the lateral offsets of the wheels and assuming a rectangular wheel base.

Figure 16:
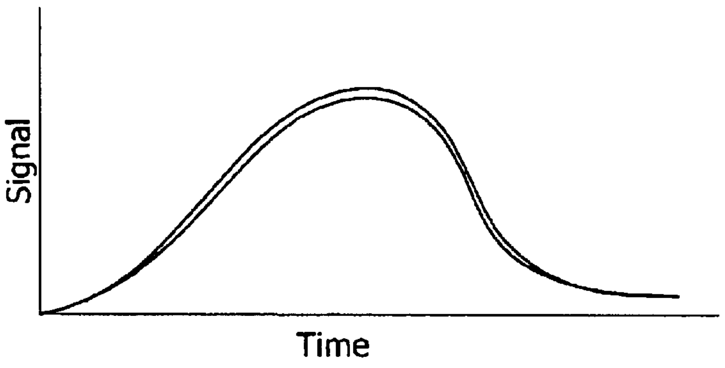
FIG. 16 is a graph of the output from each leg of a helical sensor where the legs are substantially equivalent with respect to the roadway.
Figure 17:
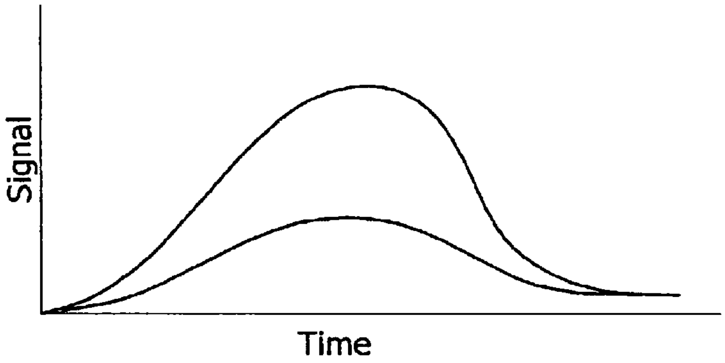
FIG. 17 is a graph of the output from each leg of a helical sensor where the legs are significantly different in orientation with respect to the roadway.

FIGS. 16 and 17 illustrate the output of a vehicle detection system using a helical sensor. The components of the inductive signature appear disproportionate as a function of the lateral offset and the helical pitch. When the legs of the two wire-loops are substantially equivalent in placement with respect to the roadway surface, the resulting component outputs are also substantially equal, as illustrated in the graph of FIG. 16. An example of this instance would be a vehicle passing over the middle of either of the inductive sensors shown in FIGS. 3 and 5. However, when the orientation of the two wire-loops is skewed such that one wire-loop is closer to the roadway surface, the components vary widely in amplitude, as illustrated in the graph of FIG. 17. An example of this instance would be a vehicle passing over the end of either of the inductive sensors shown in FIGS. 3 and 5. As before, summing the components produces an inductive signature with the lateral offset variations removed.

As previously discussed, the installation of each inductive sensor in an existing roadway requires cutting the roadway surface to receive the inductive sensor, together with the additional cuts necessary to connect the inductive sensor to the controller. However, installation of an inductive sensor during the construction of a new roadway and the resurfacing or repair of an existing roadway can be accomplished by simply embedding the inductive sensor in the roadway during the paving process. Accordingly, the installation of inductive sensors can be accomplished at a reduced cost and reduced inconvenience in the form of lane closings for installation or upgrading the inductive sensors in the roadway when coupled with new construction or during scheduled roadwork. Coupling the installation of a vehicle detection system with new construction or required roadwork has the additional advantage of reducing the risk of cutting an underground communication or power line, or at least the number of times the state or municipality places themselves at risk.

However, the state or municipality performing the roadway construction or roadwork may not have the necessary infrastructure, the current desire, or the present funds to fully implement the vehicle detection system at the time of the construction or the roadwork. Rather than delay the installation of the inductive sensors, it is beneficial to install them at the time of the construction and provide a means for connecting the sensors to associated electronics at a later time. The cost of acquiring and installing inductive sensors at the time of new construction or required roadwork is minimal and, generally, would not place an undue burden on the state or municipality. This is particularly true when the state or municipality already has plans for the installation of vehicle detection systems in the future or when current or pending laws or regulations would require the installation of such vehicle detection systems.

Using inductive sensors that are adapted to detect the lateral offset of a vehicle and that are self-calibrating and do not require precision installation allows the inductive sensors to be installed during the construction or roadwork. The use of such inductive sensors does not constrain the road crews to place the detectors in the center of a traffic lane, the boundaries of which may shift from time to time. Further, the inductive sensors can be placed at closer intervals than the one-third to one-half mile distance that is typical with conventional installations. Closer spaced inductive sensors provide greater continuity in traffic information. When combined with the ability to detect lateral offset and speed and to re-identify vehicles, closely spaced inductive sensors afford substantial public safety benefits, and offer redundancy, which reduces the need for in-pavement maintenance associated with the vehicle detection system.

Figure 18:
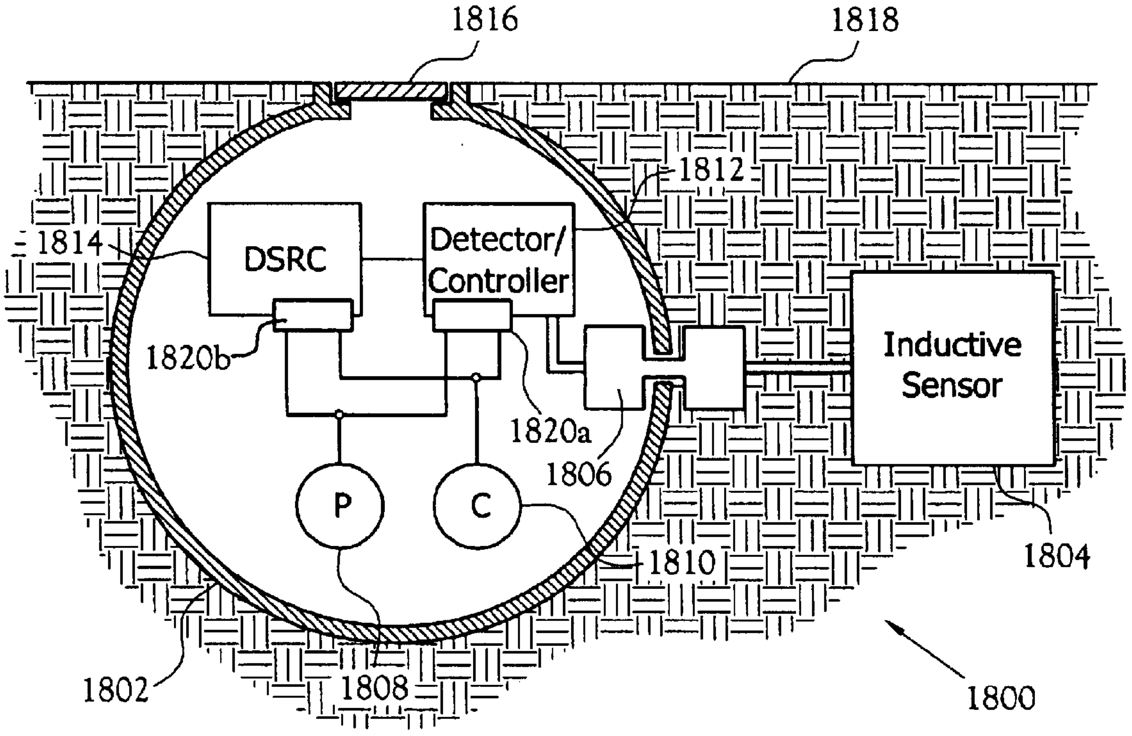
FIG. 18 illustrates a cross-sectional view of a conduit for installing a vehicle detection system.

FIG. 18 illustrates an apparatus for a vehicle detection installation system 1800. The vehicle detection installation system 1800 includes a conduit 1802 that is installed in the shoulder of the roadway, or in a roadside trench, during construction or repair of the roadway. The conduit 1802 includes a number of features allowing for the future completion, expansion or upgrade of a vehicle detection system. One feature is the ability to tie an inductive sensor 1804 into a common power and/or communications network. In the illustrated embodiment, the conduit includes connectors 1806 that pass through the wall of the conduit at selected intervals along the length of the conduit. One end of the connector 1806 is configured to secure the lead lines from the inductive sensor 1804 in electrical communication with the control circuitry 1812 contained within the conduit 1802. In an alternate embodiment, the conduit includes a pass-through port through which the lead lines from the inductive sensor are installed. Typically, the pass-through port is resistant to moisture. For example, the pass-through port can include a rubber gasket that has central cuts, which receive the lead lines of the inductive sensor and still form a substantially weather-resistant seal. Those skilled in the art will recognize that the type and manner of interconnection between the inductive sensor and the conduit can vary without departing from the scope and spirit of the present invention.

The power and/or communications network can be implemented in a number of ways. For example, the conduit can include prefabricated conductors that are inlayed in the wall of the conduit. In the illustrated embodiment, cables 1808, 1810 carry power and communications through the conduit and appropriate connections are made as desired. At selected intervals along the length of the conduit access points 1816 are provided, which allows for the easy installation and replacement of the attached devices, such as detector/controller circuits. The conduit can include shielding as necessary to provide protection from stray radio-frequency signals and other ambient noise. Again, those skilled in the art will recognize that the implementation of the power and communication networks and the attachment of the inductive sensors and associated electronics thereto can be accomplished in a number of ways without departing from the scope and spirit of the present invention.

A lidded access-port 1816, which is generally substantially flush with the roadway surface 1818, provides access to the interior of the conduit 1802. Inside the conduit, the opposite end of the connector 1806 is configured to allow connection between the external inductive sensor 1804 and the associated electronics. The conduit 1802 further provides a receptacle 1820 for connecting the associated electronics into the power and communication services network. If desired, the conduit can also include dedicated short-range communications (DSRC) equipment 1814 authorized by the FCC, or other legal body, for use in vehicle detection and traveler communication systems. The use of DSRC equipment 1814 can reduce or eliminate the need for communication and/or power cabling by allowing radio transmissions to carry the information within a specified frequency band. In addition, DSRC equipment 1814 enables two-way digital communication with passing vehicles, including safety warnings and congestion/incident information. Those skilled in the art will recognize that the connectors and the receptacle can be separated and linked manually to allow for the use of various controllers that do not employ a standard interface.

Additional safety is achieved for those installing or maintaining the vehicle detection system. For example, a service truck having an access port in the floor of the vehicle can travel down the shoulder allowing a technician within the service truck to reach down into the conduit 1802 through the access port 1816 and perform necessary installation or maintenance without leaving the safety and comfort of the service truck. It is desirable to locate the access ports 1816 along the shoulder of the road to minimize the need for traffic flow interruptions. However, where such installation is not possible, placing the access ports in a single traffic lane limits the traffic flow interruption to the closure of the dedicated traffic lane.

In another embodiment, an inductive sensor is adapted to require little or no cutting of the roadway surface so as to leave the structural integrity of the roadway intact and to reduce the cost of installation. This is useful on roadways where cutting is either undesirable or prohibited such as on bridges. It is further useful in areas where a large area of detection is desired or where lanes of travel are not clearly defined. For example, on an airport runway, a large detection grid is desirable to locate the position of an aircraft and other vehicles to allow for runway incursion mitigation; however, extensive cutting of the runway to install conventional sensors would be prohibitively expensive and could damage the structural integrity of the runway. Finally, such an inductive sensor is useful where a rapid and/or temporary installation is needed with minimal disruption to traffic flow.

Figure 19:
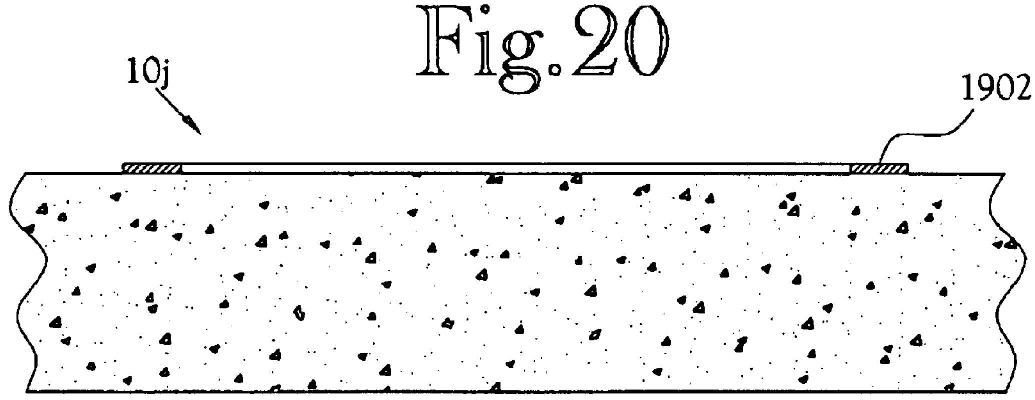
FIG. 19 illustrates an inductive sensor that requires no cutting of the roadway surface for installation.

In FIG. 19, the inductive sensor 10*j* is formed using a conductive filler mixed with an applicator material that bonds the conductive filler to the surface of the roadway. The applicator material is chosen to provide wear resistance against vehicular travel and weathering and to provide a carrier for the conductive filler. In one embodiment, the inductive sensor 1902 includes a conductive filler, such as carbon pills, that is suspended in a paint, such as those designed for lane-marking. The inductive sensor 1902 is simply painted on the surface of the roadway in the desired shape of the sensor. Such an installation would be unobtrusive and not require destructive installation procedures. Those skilled in the art will recognize that various conductive materials can be used to sense the changes in the inductive field and various applicators having the desired characteristics for a particular application can be used without departing from the scope and spirit of the present invention. With respect to the conductive materials, the primary characteristics are the ability to conduct a current and to be employed in a ratio sufficient to provide a consistent current path.

Figure 20:
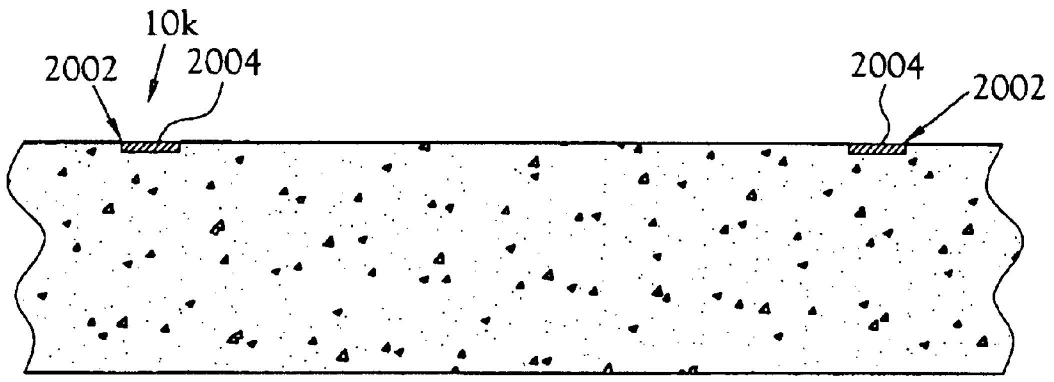
FIG. 20 illustrates an inductive sensor that requires very little cutting of the roadway surface for installation.

In an alternate embodiment of the inductive sensor 10*k*, illustrated in FIG. 20, a plurality of interconnected shallow grooves, or channels 2002, are cut into the roadway surface. These grooves 2002 have a small depth to provide rapid installation, avoid disrupting the structural integrity of the roadway and still provide sufficient depth to receive a conductive material 2004 for forming the inductive sensor 10*f*. A typical installation depth for the grooves 2002 is on the order of approximately one centimeter and a reasonable maximum depth is approximately one inch. Notwithstanding, those skilled in the art will recognize that the effective depth for the grooves can vary without departing from the scope and spirit of the present invention depending upon the surface in which the inductive sensor is being installed. Those skilled in the art will also recognize that as the depth of the groove decreases so does the durability and wear-resistance of the inductive sensor. Conversely, as the depth of the groove increases, so does the destructiveness of the installation, along with the effort required for the installation so that the benefit over installing a conventional wire-loop is lost. The shallow grooves allow for a variety of materials to be used to form the inductive sensor 10*k* that would not otherwise be suitable for direct surface application. By way of example, some materials would require a recessed installation, particularly those having the inability to withstand repeated compression under the weight of vehicles travelling the roadway and the inability to withstand repeated frictional forces tangential to the roadway surface from the wheels of vehicles travelling the roadway. The materials that can be used for the conductive material include, but are not limited, a metal which is easily melted and poured into the grooves and a conductive filler suspended in an applicator material, such as paint or rubber. Those skilled in the art will recognize that other materials that provide a medium for carrying a current can be used without departing from the scope and spirit of the present invention.

Figure 21:
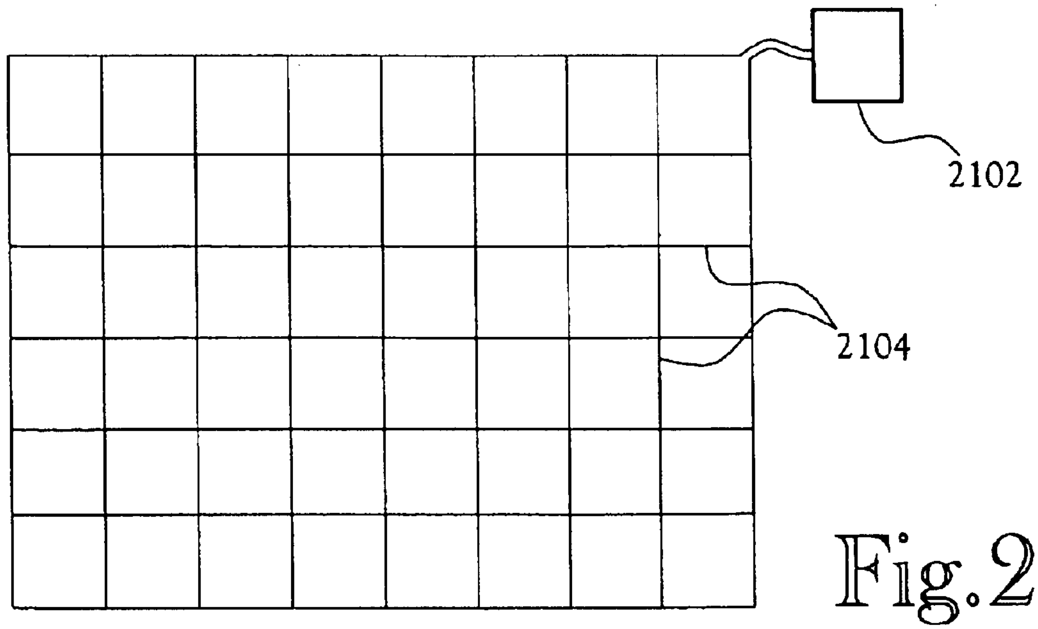
FIG. 21 illustrates an area detector.

FIG. 21 illustrates a detector 2102 connected to an inductive sensor 2104 arranged in a grid for vehicle location over a large area, such as an airport runway or a parking lot. An operationally effective inductive sensor 2104 can be configured from any of the known inductive sensor types; however, for economic purposes the use of the nondestructive inductive sensors described is desirable.

Figure 22:
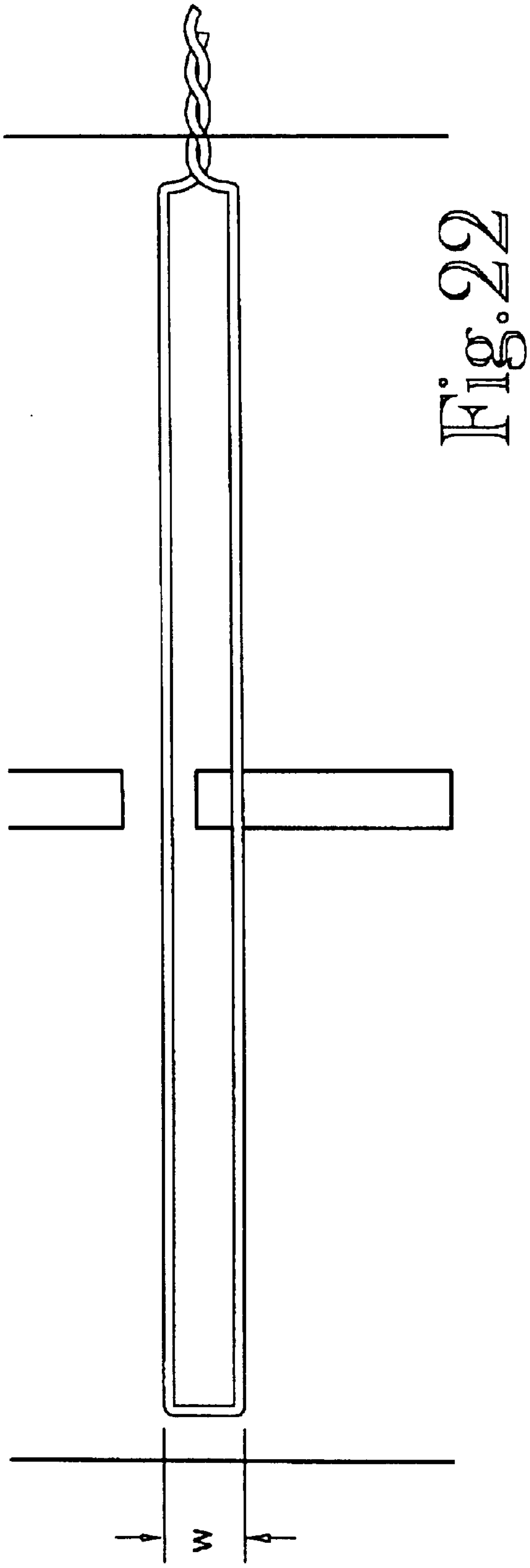
FIG. 22 illustrates an inductive sensor of a particular width.
Figure 23:
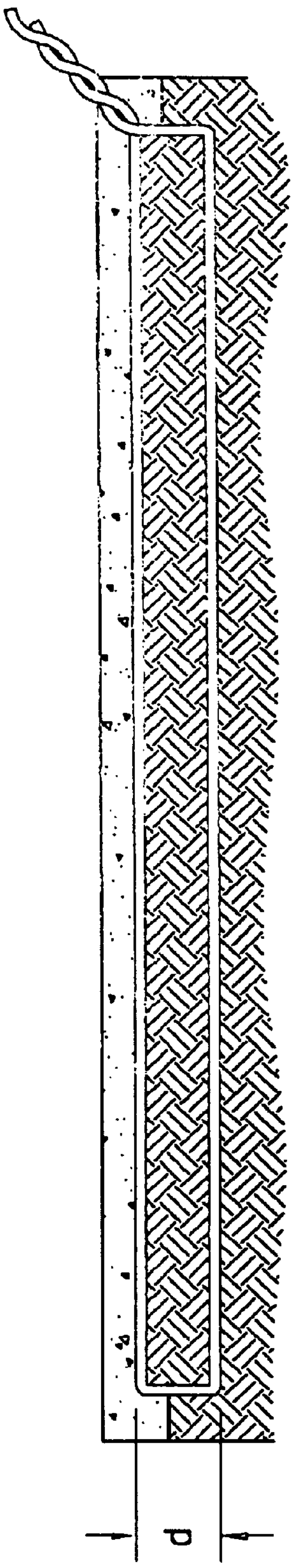
FIG. 23 illustrates an inductive sensor of a particular depth.

The dimensions of an inductive sensor of the present invention are generally outside the dimensions of conventional inductive sensors, and typically have a smaller aspect ratio. As a result, the inductive sensor of the present invention must overcome the reduction in gross detection sensitivity, i.e., reduced signal strength. The inductance measurement hardware developed by the present inventors allows the use of inductive sensors having smaller dimensions than any previously disclosed real world system. Accordingly, inductive sensors that are disposed substantially parallel to the horizontal plane representing the roadway surface are effective even where the distance, w, between the two longitudinal legs is less than fifteen centimeters, as illustrated in FIG. 22. Similarly, inductive sensors that are disposed substantially perpendicular to the horizontal plane representing the roadway surface are effective even where the distance, d, between the two horizontal legs is less than three feet and the coil has less than 200 turns, as illustrated in FIG. 23.

Further, conventional inductive sensors are separated to minimize crosstalk. The inductance measurement hardware developed by the present inventors controls or uses crosstalk and does not require undue separation between the inductive sensors.

The above disclosure of inductive sensor configurations and installation methods generally contemplates the use of inductance measuring electronics. However, those skilled in the art will recognize that the various embodiments can be used with other types of detection systems without departing from the scope and spirit of the present invention. For example, the inductive sensor configurations taught herein can be adapted for use with a magnetometer-based vehicle detection system. This can be accomplished by deploying an array of point magnetometers. Alternatively, one or more magnetoresistive elements or other sensing elements, such as fluxgate magnetometer, can be substituted for the wire-loop.

While exemplary embodiments have been shown and described, it will be understood that these are not intended to limit the disclosure, but rather these are intended to cover all modifications and alternate methods falling within the spirit and the scope of the invention as defined in the appended claims.

What is claimed is:

1. An inductive sensor for use in a roadway having a surface, said inductive sensor comprising:

a first wire-loop defining a first end, a second end and a longitudinal axis that is substantially parallel to the roadway surface, said first-wire loop having a first leg and a second leg that are symmetrically disposed in relation to said longitudinal axis, an end of said first leg being in electrical communication with a proximate end of said second leg, said first wire-loop second end being offset from said first wire-loop first end by a selected angular offset.

2. The inductive sensor of claim 1 wherein said first leg and said second leg are substantially equidistant from said longitudinal axis.

3. The inductive sensor of claim 1 wherein said first leg and said second leg are helically wound around said longitudinal axis.

4. The inductive sensor of claim 1 further comprising a second wire-loop defining a longitudinal axis, said second wire-loop having a first leg and a second leg that are substantially equidistant, helically wound around, and symmetrically disposed in relation to said longitudinal axis, said second wire-loop offset from said first wire-loop by approximately ninety degrees.

5. The inductive sensor of claim 1 further comprising a loop-forming member upon which said first wire-loop is disposed.

6. The inductive sensor of claim 5 wherein said loop-forming member is a cylindrical form.

7. The inductive sensor of claim 1 further comprising an inductance measurement circuit in electrical communication with said first wire-loop.

8. The inductive sensor of claim 1 wherein said angular offset is approximately ninety degrees over a selected length.

9. An inductive sensor for use in a roadway having a surface and width, said inductive sensor comprising:

a first wire-loop and a second wire-loop, each of said first wire-loop and said second wire-loop defining a longitudinal axis that is substantially parallel to the roadway surface and a pair of longitudinal legs, each said pair of longitudinal legs helically wound around said longitudinal axis, said first wire-loop being radially offset from said second wire-loop by a predetermined angular offset.

10. An inductive sensor for use in a roadway defining a surface, said inductive sensor comprising:

a first wire-loop and a second wire-loop each defining at least three legs, one of said at least three legs of each of said first wire-loop and said second wire-loop being internal to a generally planar quadrilateral defined by the remaining of said at least three legs of each of said first wire-loop and said second wire-loop, said internal legs abutting one another and intersecting said longitudinal axis at a selected point.

11. The inductive sensor of claim 10 wherein said internal legs bisect said longitudinal axis.

12. The inductive sensor of claim 10 wherein each of said first wire-loop and said second wire-loop lie in a plane substantially perpendicular to said roadway surface.

13. The inductive sensor of claim 10 wherein each of said first wire-loop and said second wire-loop lie in a plane substantially parallel to said roadway surface.

14. An inductive sensor for use in a roadway defining a surface, said inductive sensor comprising:

a first wire-loop and a second wire-loop geometrically arranged to form a quadrilateral, said quadrilateral enclosing an inner leg of each of said first wire-loop and said second wire-loop, said first wire-loop inner leg abutting said second wire-loop inner leg, said first wire-loop inner leg and said second wire-loop inner leg dividing said quadrilateral into said two segments of substantially equal area.

15. The inductive sensor of claim 14 wherein each of said first wire-loop and said second wire-loop lie in a plane substantially perpendicular to said roadway surface.

16. The inductive sensor of claim 14 wherein each of said first wire-loop and said second wire-loop lie in a plane substantially parallel to said roadway surface.

17. An inductive sensor for use in a roadway defining a surface and a direction of vehicular travel, said inductive sensor comprising:

a primary wire-loop defining a pair of longitudinal segments, a first lateral segment, and a second lateral segment, said first lateral segment and said second lateral segment being substantially parallel to the direction of vehicular travel, said first lateral segment and said second lateral segment being of unequal length; and a secondary wire-loop defining a pair of longitudinal segments, a first lateral segment, and a second lateral segment, said first lateral segment and said second lateral segment being substantially parallel to the direction of vehicular travel, said first lateral segment and said second lateral segment being of unequal length, said primary wire-loop first lateral segment and said secondary wire-loop second lateral segment being substantially equal in length, said primary wire-loop second lateral segment and said secondary wire-loop second lateral segment being substantially equal in length.

18. An inductive sensor for use in a roadway defining a surface and a direction of vehicular travel, said inductive sensor comprising:

a primary wire-loop defining a pair of longitudinal legs and at least one lateral leg, said at least one primary wire-loop lateral leg being substantially parallel to the direction of vehicular travel, a first of said pair of longitudinal legs electrically connected to an end of first said at least one lateral leg, a second of said pair of longitudinal legs electrically connected to an opposing end of said at least one lateral leg; and a secondary wire-loop defining a pair of longitudinal legs and at least one lateral leg, said at least one secondary wire-loop lateral leg being substantially parallel to the direction of vehicular travel, a first of said pair of longitudinal legs electrically connected to an end of first said at least one lateral leg, a second of said pair of longitudinal legs electrically connected to an opposing end of said at least one lateral leg, wherein said secondary wire-loop at least one lateral leg and said primary wire-loop at least one lateral leg are substantially equal in length.

19. The inductive sensor of claim 18 wherein each of said primary wire-loop and said secondary wire-loop lie in a plane substantially perpendicular to said roadway surface.

20. The inductive sensor of claim 18 wherein each of said primary wire-loop and said secondary wire-loop lie in a plane substantially parallel to said roadway surface.

21. The inductive sensor of claim 18 wherein said first of said pair of longitudinal legs of each of said primary wire-loop and said secondary wire-loop and all of said at least one lateral legs of said primary wire-loop and said secondary wire-loop define a perimeter of a quadrilateral.

22. An inductive sensor for use in a roadway defining a surface and a direction of vehicular travel, said inductive sensor comprising:

a primary wire-loop defining a pair of longitudinal legs and at least one lateral leg, each of said pair of longitudinal legs and said at least one lateral leg having a first and an opposing second end, said at least one lateral leg being substantially parallel to the direction of vehicular travel, a first end of a first said pair of longitudinal legs connected to a first end of a first said at least one lateral leg, a first end of a second of said pair of longitudinal legs connected to an opposing end of said first lateral leg, said second ends of said pair of longitudinal legs being in electrical communication; and a secondary wire-loop defining a pair of longitudinal legs and at least one lateral leg, said at least one lateral leg being substantially parallel to the direction of vehicular travel, a first of said pair of longitudinal legs connected to a first end of a first said at least one lateral leg, a second of said pair of longitudinal legs connected to an opposing end of said first lateral leg, said second ends of said pair of longitudinal legs being in electrical communication, wherein a distance between said primary wire-loop pair of longitudinal legs second ends is substantially equal to a distance between said secondary wire-loop pair of longitudinal legs second ends.

23. The inductive sensor of claim 22 wherein said second ends of each said pair of longitudinal legs are electrically connected by a second at least one lateral leg.

24. The inductive sensor of claim 22 wherein said second ends of each said pair of longitudinal legs are directly connected.

25. The inductive sensor of claim 22 wherein each of said primary wire-loop and said secondary wire-loop lie in a plane substantially perpendicular to said roadway surface.

26. The inductive sensor of claim 22 wherein each of said primary wire-loop and said secondary wire-loop lie in a plane substantially parallel to said roadway surface.

27. The inductive sensor of claim 22 wherein said first of said pair of longitudinal legs of each of said primary wire-loop and said secondary wire-loop and all of said at least one lateral legs of said primary wire-loop and said secondary wire-loop define a perimeter of a quadrilateral.

* * * * *